United States Patent
Tsukada et al.

(10) Patent No.: US 7,265,075 B2
(45) Date of Patent: Sep. 4, 2007

(54) HYDRO-REFINING CATALYST, CARRIER FOR USE THEREIN AND METHOD FOR PRODUCTION THEREOF

(75) Inventors: Takayuki Tsukada, Toda (JP); Motoi Saito, Toda (JP); Masayuki Mori, Toda (JP)

(73) Assignee: Japan Energy Corporation, Tokyo (JP)

( * ) Notice: Subject to any disclaimer, the term of this patent is extended or adjusted under 35 U.S.C. 154(b) by 43 days.

(21) Appl. No.: 10/483,123

(22) PCT Filed: Jul. 9, 2002

(86) PCT No.: PCT/JP02/06934

§ 371 (c)(1), (2), (4) Date: Jan. 8, 2004

(87) PCT Pub. No.: WO03/006156

PCT Pub. Date: Jan. 23, 2003

(65) Prior Publication Data

US 2004/0186014 A1    Sep. 23, 2004

(30) Foreign Application Priority Data

Jul. 10, 2001 (JP) ............................ 2001-209051

(51) Int. Cl.
- *B01J 27/00* (2006.01)
- *B01J 27/19* (2006.01)
- *B01J 23/00* (2006.01)
- *C01F 7/02* (2006.01)

(52) U.S. Cl. .................... 502/208; 502/209; 502/210; 502/211; 502/213; 502/313; 502/325; 502/335; 502/337; 502/415; 423/625; 423/628

(58) Field of Classification Search ........ 502/208–211, 502/213, 313, 315, 323, 325, 335, 337, 415, 502/625, 628; 423/625, 628
See application file for complete search history.

(56) References Cited

U.S. PATENT DOCUMENTS 3,879,310 A * 4/1975 Rigge et al. ............. 502/208
3,904,550 A * 9/1975 Pine ......................... 502/439

(Continued)

FOREIGN PATENT DOCUMENTS

EP    0 448 117 A1    9/1991

(Continued)

*Primary Examiner*—J. A. Lorengo
*Assistant Examiner*—Patricia L. Hailey
(74) *Attorney, Agent, or Firm*—Birch, Stewart, Kolasch & Birch, LLP

(57) ABSTRACT

A method for producing a hydrorefining catalyst of the present invention has a step of preparing an aluminum solution containing phosphorus in a molar ratio of 0.001 to 0.05 with respect to aluminum; a step of neutralizing the prepared aluminum solution to produce a pseudo-boehmite powder; a step of forming the pseudo-boehmite powder followed by performing calcination at a temperature of not less than 650° C. to obtain a carrier; and a step of carrying a hydrogenation-active metal on the pseudo-boehmite powder or the carrier. The dispersion of the concentration distribution of phosphorus in the carrier of the obtained catalyst is within 10%. This method makes it possible to obtain the hydrorefining catalyst which has a practically sufficient mechanical strength and which has an excellent activity.

13 Claims, 4 Drawing Sheets

U.S. PATENT DOCUMENTS

| | | | |
|---|---|---|---|
| 3,969,273 A | | 7/1976 | Brown et al. |
| 4,080,311 A | * | 3/1978 | Kehl .................... 502/208 |
| 4,255,282 A | * | 3/1981 | Simpson ................ 502/211 |
| 4,446,248 A | * | 5/1984 | Simpson et al. ........ 502/211 |
| 4,624,938 A | | 11/1986 | Kemp |
| 4,629,717 A | * | 12/1986 | Chao .................... 502/208 |
| 4,727,209 A | * | 2/1988 | Chao .................... 585/466 |
| 4,760,040 A | * | 7/1988 | Sato et al. .............. 502/68 |
| 5,139,648 A | * | 8/1992 | Lambert ............. 208/111.15 |
| 5,147,525 A | * | 9/1992 | Chang et al. ............ 208/46 |
| 5,600,046 A | * | 2/1997 | Gosling et al. .......... 585/322 |
| 6,022,513 A | * | 2/2000 | Pecoraro et al. ......... 423/311 |
| 6,069,291 A | * | 5/2000 | Rossin et al. ............ 588/316 |
| 6,111,037 A | * | 8/2000 | Auburn et al. ........... 526/90 |
| 6,429,172 B1 | * | 8/2002 | Tsukada et al. .......... 502/439 |
| 6,858,132 B2 | * | 2/2005 | Kumagai et al. ...... 208/216 PP |
| 6,884,406 B2 | * | 4/2005 | Sato et al. .............. 423/626 |
| 2004/0126315 A1 | * | 7/2004 | Saito et al. ............ 423/628 |

FOREIGN PATENT DOCUMENTS

| | | |
|---|---|---|
| JP | 61-254254 A | 11/1986 |
| JP | 3-275142 A | 12/1991 |
| JP | 2000-135438 A | 5/2000 |

\* cited by examiner

CROSS SECTION OF CATALYST

CROSS SECTION OF CATALYST

HYDRO-REFINING CATALYST, CARRIER FOR USE THEREIN AND METHOD FOR PRODUCTION THEREOF

TECHNICAL FIELD

The present invention relates to a catalyst to be used for hydrorefining of hydrocarbon oils such as petroleum, a method for producing the same, and a carrier to be used for the catalyst.

BACKGROUND ART

Those frequently used as the hydrorefining catalyst in the petroleum refining include a catalyst in which a hydrogenation-active metal component, which has the hydrogenation ability, is carried on an alumina carrier. In the hydrorefining, the hydrocarbon oil and the hydrorefining catalyst are allowed to make contact with each other in the presence of hydrogen, in which it is possible to remove heteroelements contained in the hydrocarbon oil, i.e., sulfur, nitrogen, and metal components (for example, vanadium, nickel, and iron). A variety of investigations have been hitherto made in relation to the catalyst as described above, for example, about the active metal, the properties of the carrier, the pore structure, and the method for carrying the active metal in order to improve the ability to remove the heteroelements.

A hydrorefining catalyst having a high activity is obtained by using, as a carrier for the hydrorefining catalyst, an alumina carrier which can be manufactured by kneading and forming a fine powder of pseudo-boehmite as an alumina hydrate, followed by being calcinated. A phosphorus component is sometimes contained in the hydrorefining catalyst. The phosphorus component is carried such that the component is contained in a carrying solution in some cases, or the phosphorus component is added when the carrier is manufactured in other cases. For example, in Japanese Patent Application Laid-open No. 61-254254 (corresponding to U.S. Pat. No. 4,624,938), a catalyst carrier is manufactured by adding a phosphorus-containing compound to a precipitate of alumina hydroxide, followed by being calcinated.

DISCLOSURE OF THE INVENTION

An object of the present invention is to provide a novel method for producing a hydrorefining catalyst which contains a phosphorus component in a carrier and which has a practically sufficient mechanical strength and a high catalytic activity.

The present inventors have found out the fact that the practically sufficient mechanical strength is obtained and the activity of the hydrorefining catalyst is improved, when a carrier is used, in which a phosphorus component is contained in a raw material solution for synthesizing pseudo-boehmite and the obtained pseudo-boehmite is calcinated at a specified temperature. Thus, the present invention has been completed.

According to a first aspect of the present invention, there is provided a method for producing a hydrorefining catalyst comprising:

a step of preparing an aluminum solution containing phosphorus in a molar ratio of 0.001 to 0.05 with respect to aluminum;

a step of neutralizing the prepared aluminum solution to produce a pseudo-boehmite powder;

a step of forming the pseudo-boehmite powder followed by performing calcination at a temperature of not less than 650° C. to obtain a carrier; and a step of carrying a hydrogenation-active metal on the pseudo-boehmite powder or the carrier.

In the present invention, the calcination temperature for the formed pseudo-boehmite powder is preferably 700° C. to 900° C. and especially preferably 750° C. to 850° C. The hydrogenation-active metal may be carried by impregnating the carrier with a solution containing the hydrogenation-active metal followed by further performing calcination. Alternatively, the hydrogenation-active metal may be carried by adding the hydrogenation-active metal while kneading the pseudo-boehmite powder formed in the step of forming the pseudo-boehmite powder.

The hydrogenation-active metal may be at least one selected from the group consisting of molybdenum, tungsten, cobalt, and nickel. In particular, it is preferable that the hydrogenation-active metal contains at least molybdenum or tungsten and cobalt or nickel.

According to a second aspect of the present invention, there is provided a carrier for a hydrorefining catalyst comprising:

γ-alumina which is a main component; and phosphorus which is contained in a molar ratio of 0.001 to 0.05 with respect to aluminum, wherein:

a dispersion of a concentration distribution of phosphorus in the carrier is within 10%; and an exothermic peak temperature, which is brought about by phase transition of γ-alumina into α-alumina when the carrier is subjected to differential thermal analysis, is not less than 1,300° C. It is preferable that the exothermic peak temperature is not less than 1,350° C.

As for the carrier for the hydrorefining catalyst of the present invention, it is desirable that a half value width $W\gamma$ of a (400) peak of powder X-ray diffraction of γ-alumina satisfies $(W\gamma/W\alpha) \leq 10$ with respect to a half value width $W\alpha$ of a (113) peak of α-alumina. It is appreciated that the carrier is sufficiently crystallized by satisfying the condition as described above.

According to a third aspect of the present invention, there is provided a hydrorefining catalyst comprising the carrier for the hydrorefining catalyst according to the second aspect of the present invention; and a hydrogenation-active metal which is carried on the carrier.

BEST MODE FOR CARRYING OUT THE INVENTION

Aluminum Solution

Figure 1:
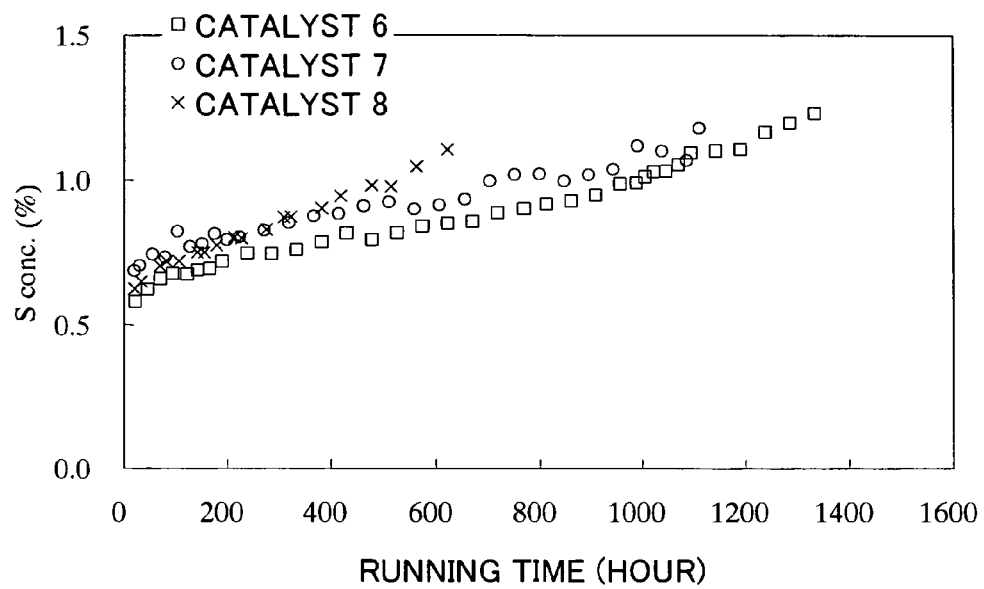
FIG. 1 shows a graph illustrating results of the hydrorefining treatment based on the use of Catalysts 6 to 8 manufactured in Examples, which depicts the relationship of the sulfur concentration in the produced oil with respect to the running time.

The aluminum solution to be used for the present invention contains phosphorus in a molar ratio of 0.001 to 0.05 and preferably 0.003 to 0.03 or 0.008 to 0.04 with respect to contained aluminum. The aluminum solution may be either an acidic aluminum solution or an alkaline aluminum solution. The form of phosphorus to be contained is not specifically limited. However, phosphorus is ordinarily contained in a form of phosphoric acid or phosphate.

Those usable as the acidic aluminum solution include, for example, aqueous solutions of acidic salts and inorganic acids such as sulfuric acid and hydrochloric acid. However, those preferably usable are aqueous solutions of acidic aluminum salt such as aluminum sulfate and aluminum chloride. In this case, the aluminum concentration of the acidic aluminum aqueous solution is preferably 0.5 to 3 mol/L.

In view of the reuse of resources, it is preferable to use, as the acidic aluminum solution, acidic liquid wastes containing aluminum and solutions obtained by dissolving aluminum waste materials and aluminum hydroxide sludges. In particular, a low crystalline aluminum hydroxide sludge, which is called "aluminum sludge" of aluminum surface treatment factories and which is generated from the liquid waste treatment step, is preferably used, because the solubility is high. Those usable as the acidic liquid waste containing aluminum include, for example, aluminum etching liquid wastes and liquid wastes of electrolyte solutions for the anodic oxidation treatment. Further, it is possible to use solutions obtained by dissolving, in acid, chips or scraps produced during the aluminum processing, aluminum metal contents contained in wastes, and aluminum hydroxide sludges.

Aluminic acid aqueous solutions are preferably used as the alkaline aluminum solution. The aluminum concentration of the aluminic acid aqueous solution is preferably 0.3 to 6 mol/L and especially preferably 0.5 to 4 mol/L. The molar ratio of alkali/aluminum is preferably 1 to 3 and especially preferably 1.5 to 2.8. In view of the reuse of resources, it is preferable to use, as the alkaline aluminum solution, alkaline liquid wastes containing aluminum and solutions obtained by dissolving aluminum waste materials.

Formation of Pseudo-Boehmite Powder

The pseudo-boehmite powder is produced by neutralizing the aluminum solution. The neutralization can be performed by mixing acid or alkali with the aluminum solution or by mixing the acidic aluminum solution and the alkaline aluminum solution with each other. The mixing is preferably performed at a temperature of 40 to 80° C. and especially preferably 55 to 75° C. The mixing ratio is preferably adjusted so that pH of the mixture liquid is preferably 7 to 10.5 and especially preferably 8.5 to 9.5. If pH is less than the above, it is difficult to filtrate the synthesized pseudo-boehmite powder. If pH exceeds the above, then no pseudo-boehmite is produced and bayerite tends to be produced. The obtained pseudo-boehmite powder is filtrated and washed with water, and it is used as a raw material for the carrier. The pseudo-boehmite powder may be dried after the washing with water, for example, for the purpose of transport.

Physical Properties of Pseudo-Boehmite Powder

The obtained pseudo-boehmite is an alumina hydrate which has an extra amount of water molecules in the crystals. The pseudo-boehmite is represented by $Al_2O_3 \cdot xH_2O$ wherein x is not less than 1 and less than 2. The X-ray diffraction index of boehmite is described in ASTM Card No. 5-0190. According to the present invention, pseudo-boehmite having (020) spacings of 6.4 to 6.7 angstroms is preferably obtained.

When the specific surface area of the pseudo-boehmite, which is measured by the nitrogen adsorption method, is 100 to 500 $m^2/g$ and especially preferably 300 to 500 $m^2/g$, it is possible to obtain higher catalytic activities. Further, the pore volume, which is measured by the nitrogen adsorption method, is preferably 0.3 to 1.8 mL/g and especially preferably 0.5 to 1.2 mL/g. If the pore volume is less than those in the range described above, it is difficult to obtain any initial activity of the catalyst. On the contrary, if the pore volume exceeds those in the range described above, the mechanical strength of the catalyst carrier is deteriorated.

Carrier

The carrier according to the present invention can be manufactured by calcinating the pseudo-boehmite as described above. The calcination temperature is higher than the calcination temperature for ordinary alumina carriers. The calcination is performed, for example, at a temperature of not less than 650° C., preferably 650° C. to 900° C., especially preferably 700° C. to 900° C., and more especially preferably 750° C. to 850° C. The reason thereof is considered as follows by the present inventors. It has been revealed that phosphorus, which exists in alumina, inhibits the crystallization of alumina. As for this fact, it is considered that phosphorus and alumina are chemically bonded to one another to give a stable state in view of the energy. That is, the pseudo-boehmite obtained in the present invention is stabilized in view of the energy, because the pseudo-boehmite contains phosphorus in a uniformly dispersed manner. As a result, it is considered that the sintering temperature, which is required to crystallize alumina, is high. It is preferable that the drying is performed before the calcination at ordinary temperature to 150° C. and especially preferably 100 to 130° C. It is preferable that the calcination time is 0.2 to 12 hours and especially preferably 0.5 to 5 hours after the arrival at the calcination temperature. Usually, the material is formed to have a shape such as a pellet shape or a honeycomb shape by using an apparatus such as screw type extruder before the drying step. The shape, which is typically used, includes, for example, clover shapes, cylindrical shapes, cylinder shapes, and spherical shapes having diameters of 0.5 to 5 mm.

It is preferable that the pseudo-boehmite is kneaded and formed before the calcination. The kneading can be performed by using a kneader which is generally used to prepare catalysts. For example, a method is preferably used, in which the water content of the pseudo-boehmite is adjusted followed by being mixed with stirring vanes. Usually, when the dry pseudo-boehmite is used, water is added during the kneading. However, alcohol and ketone may be used as the liquid to be added. The time and the temperature required for the kneading can be appropriately selected. The kneading may be performed while adding, for example, acids such as nitric acid, bases such as ammonia, organic compounds, binders, ceramic fibers, surfactants, hydrogenation-active components, and zeolite. The crystal growth of the pseudo-boehmite can be also effected by means of the kneading.

It is also possible to adjust the pore diameter distribution of the carrier to be obtained by means of the kneading. In order to prepare a carrier in which any macropore is substantially absent, it is preferable to use a powder having a high dispersibility. In order to prepare a carrier which has macropores, it is preferable to use a powder having a low dispersibility. If the dispersibility is too high, the water stability of the obtained carrier is low, which is not preferred. Specifically, the dispersibility index of the pseudo-boehmite powder is preferably 0.10 to 0.90 and especially preferably 0.15 to 0.80. In the case of the pseudo-boehmite powder containing phosphorus, a carrier having high water stability is obtained. Therefore, it is possible to obtain those having sufficient mechanical strength even in the case of the dispersibility which is higher than those of pseudo-boehmite powders containing no phosphorus. In order to prepare the carrier having macropores, the dispersibility index is preferably not more than 0.15 and especially preferably not more than 0.10. The dispersibility index can be measured as follows. 6 g of the pseudo-boehmite powder to be evaluated is introduced into a vessel together with 30 mL of water and 60 mL of 0.1 N aqueous nitric acid solution followed by being ground or pulverized with a blender to obtain a slurry. The slurry is separated by means of the centrifugal separation at 3,000 rpm for 3 minutes into a suspension and a precipitate which are transferred to vessels followed by being dried to measure solid content weights thereof respectively. The dispersibility index is represented by a value obtained by dividing the solid content weight of the suspension by the total of the solid content weight of the suspension and the solid content weight of the precipitate.

Characteristics of Carrier

As for the carrier, when the specific surface area, which is measured by the nitrogen adsorption method, is 50 to 400 m$^2$/g, it is possible to obtain a higher catalytic activity. It is preferable that the pore volume, which is measured by the nitrogen adsorption method, is preferably 0.4 to 1.2 mL/g and especially preferably 0.5 to 1.0 mL/g. If the pore volume is not more than the value in this range, it is difficult to obtain the initial activity of the catalyst. On the contrary, if the pore volume exceeds the range as described above, the mechanical strength of the catalyst is deteriorated. It is preferable that the carrier is substantially composed of γ-alumina. However, it is also possible to contain, as carrier components other than γ-alumina, other components in an amount of not more than 20% by weight and especially preferably not more than 5% by weight with respect to the weight of the carrier.

The carrier for the hydrorefining catalyst according to the present invention includes the main component of γ-alumina which contains phosphorus in a molar ratio of 0.001 to 0.05 with respect to aluminum. The ratio (Wγ/Wα) between the half value width Wγ of the (400) peak of the powder X-ray diffraction of γ-alumina and the half value width Wα of the (113) peak of α-alumina is not more than 10, preferably 8.5 to 10, and more preferably 8.5 to 9.0. The half value width can be measured by containing an internal standard of α-alumina in a powder sample for the X-ray diffraction. The crystallinity, which is specified by the ratio (Wγ/Wα), is equivalent even in the case of the catalyst which is obtained by allowing the carrier to carry the hydrogenation-active metal. The reason, why the value of the ratio (Wγ/Wα) has the reference of 10, is that alumina is sufficiently crystallized when the ratio (Wγ/Wα) is not more than 10. Further, the carrier for the hydrorefining catalyst according to the present invention is also identified by the fact that the exothermic peak temperature, which results from the phase transition of γ-alumina into α-alumina, appears at a temperature of not less than 1,300° C., preferably not less than 1,350° C., and more preferably 1,360° C. to 1,400° C.

When the carrier of the present invention is used for the hydrorefining catalyst for middle distillate products including, for example, kerosene distillate products, gas oil distillate products, and vacuum gas oil distillate products, it is preferable that the carrier has the following characteristic. The specific surface area, which is measured by the nitrogen gas adsorption method, is preferably 100 to 400 m$^2$/g and especially preferably not less than 200 m$^2$/g. The pore volume is preferably 0.3 to 1 mL/g and especially preferably not less than 5 mL/g. The median pore diameter is preferably 3 to 20 nm and especially preferably 4 to 12 nm. In this specification, the term "middle distillate product" is the distillate product having 50% distillation temperatures of less than 480° C. Usually, the 90% distillation temperature of the middle distillate product is not more than 580° C.

When the carrier of the present invention is used for the hydrorefining catalyst for the heavy oil, it is preferable that the carrier has the following characteristic. The specific surface area, which is measured by the nitrogen gas adsorption method, is preferably 100 to 400 m$^2$/g and especially preferably not less than 150 m$^2$/g. The pore volume, which is measured by the nitrogen gas adsorption method, is preferably 0.3 to 1 mL/g and especially preferably not less than 5 mL/g. The median pore diameter is preferably 3 to 20 nm and especially preferably 4 to 20 nm. In this specification, the term "heavy oil" is the distillate product containing a residual carbon content of not less than 1%. Usually, the heavy oil is exemplified, for example, by atmospheric distillation residue and vacuum distillation residue.

Hydrorefining Catalyst

The hydrorefining catalyst is manufactured by allowing the carrier described above to carry the hydrogenation-active metal component. Those usable as the hydrogenation-active metal component to be carried include at least one metal element selected from metal elements belonging to Group 6, Group 9, and Group 10 of the periodic table. It is preferable to use at least one of metal elements belonging to Group 6 of the periodic table, especially molybdenum or tungsten and at least one of metal elements belonging to Group 9 or Group 10, especially any one of nickel and cobalt or both of the elements. It is preferable that the elements are contained on the carrier in a state of oxide or in a state of sulfide. It is also possible to carry, for example, oxide or sulfide of phosphorus other than the hydrogenation-active metal components.

The metal components may be carried by using ordinarily employed impregnating methods, for example, known techniques such as the pore-filling method, the heating impregnating method, the vacuum impregnating method, the immersing method, and the kneading method. Typically, the carrying process can be performed by impregnating the carrier with an aqueous solution containing the hydrogenation-active metal component and effecting the drying followed by performing the calcination. The pore-filling method is used especially preferably. In the pore-filling method, the carrying solution, which is in an amount approximately equivalent to the pore volume (in a volume of 0.2 to 5-fold, preferably in a volume of 0.5 to 2-fold the pore volume), is allowed to contact with the carrier uniformly, for example, by means of the method in which the carrying solution is used in a form of mist. In this procedure, as for the metal element belonging to Group 6, it is preferable to use an aqueous solution of a compound including, for example, ammonium paramolybdate, paramolybdic acid, ammonium molybdate, phosphomolybdic acid, ammonium tungstate, tungstic acid, anhydrous tungstic acid, and phosphotungstic acid. As for the metal element belonging to Group 9 or 10, it is possible to use an aqueous solution of, for example, nitrate, sulfate, chloride, fluoride, bromide, acetate, carbonate, and phosphate of nickel or cobalt.

An atmosphere, which sufficiently contains air or oxygen, is used for the calcination for the carrying process. The calcination is performed within a temperature range of 400° C. to 800° C., preferably 400 to 600° C., and especially preferably 450 to 550° C., favorably at a temperature lower than the calcination temperature for the carrier. It is preferable that the time required to raise the temperature up to the calcination temperature is 10 to 240 minutes, and the holding time at the calcination temperature is 1 to 240 minutes. Preferably, the drying is performed before the calcination. The drying is performed usually within a temperature range of 50 to 180° C. and preferably 80 to 150° C. for 10 minutes to 24 hours.

The carrying amount is preferably as follows with respect to the weight of the catalyst in view of the hydrorefining activity including, for example, the desulfurization and the denitrogenation. That is, as for the metal element belonging to Group 6, the total metal element weight is preferably 1 to 15% by weight and especially preferably 5 to 10% by weight. As for the metal element belonging to Group 9 or 10, the total metal element weight is preferably 0.5 to 5% by weight and especially preferably 1 to 3% by weight. The metal component can be also carried by adding and kneading the metal component during the process of kneading the pseudo-boehmite. The catalyst composition is especially preferably as follows. That is, molybdenum is preferably used in a metal element weight of 3 to 20% by weight and especially preferably 7 to 18% by weight. Cobalt and nickel is preferably used in a metal element weight of 1 to 8% by weight and especially preferably 2 to 5% by weight. Phosphorus is preferably used in a phosphorus element weight of 0.1 to 5% by weight, especially preferably 0.2 to 3% by weight, and more preferably 0.5 to 1% by weight.

When the hydrorefining catalyst of the present invention is used for the hydrorefining for middle distillate products, it is desirable that the following ranges are adopted. That is, the specific surface area is preferably 50 to 350 m²/g and more preferably 150 to 300 m²/g, the pore volume is preferably 0.1 to 1 mL/g and more preferably 0.3 to 0.8 mL/g, and the median pore diameter is preferably 3 to 20 nm and more preferably 4 to 12 nm. When the hydrorefining catalyst of the present invention is used for the refining for heavy oils, it is desirable that the following ranges are adopted. That is, the specific surface area is preferably 50 to 350 m²/g and more preferably 150 to 300 m²/g, the pore volume is preferably 0.1 to 1 mL/g and more preferably not less than 0.3 mL/g, and the median pore diameter is preferably 3 to 20 nm and more preferably 4 to 20 nm.

The hydrorefining catalyst is subjected to a sulfurizing treatment by making contact with a sulfur-containing compound prior to the use. Those usable as the sulfur-containing compound include, for example, carbon disulfide, dimethyl disulfide, butylmercaptan, and dimethylmercaptan. The sulfurizing treatment is performed before packing the reactor with the catalyst or after packing the reactor with the catalyst.

The hydrorefining condition based on the use of the catalyst produced according to the present invention may be selected within the following ranges. That is, the reaction temperature is preferably 250 to 500° C. and more preferably 300 to 450° C., the reaction pressure is 1 to 30 MPa and preferably 3 to 20 MPa, the hydrogen flow rate is preferably in a hydrogen/oil ratio of 50 to 5,000 L/L and more preferably 100 to 2,000 L/L, and the liquid hourly space velocity (LHSV) is preferably 0.1 to 10/hour and more preferably 0.2 to 5/hour.

EXAMPLES

The present invention will be explained in more detail below as exemplified by Examples. However, the scope of the present invention is not limited by Examples.

Example 1

Evaluation of Initial Activity 1

An aluminum hydrochloride aqueous solution having an aluminum concentration of 2.6 mol/L was prepared, in which phosphoric acid was added so that the phosphorus concentration was 0.03 mol/L (molar ratio of phosphorus with respect to aluminum P/Al=about 0.012). 4.6 mol/L of a sodium hydroxide aqueous solution was added dropwise to warmed water to make adjustment so that pH was 9.0. After that, the aluminum hydrochloride aqueous solution and the sodium hydroxide aqueous solution were simultaneously poured continuously into a vessel while performing agitation and mixing. The liquid temperature during the mixing was 60° C. The pouring amounts of the respective solutions were adjusted so that pH was 9.0. The mixing was continued for 17 minutes to obtain 500 L of a mixture liquid. The mixture liquid was left to stand for 30 minutes, and then an obtained slurry was filtrated and washed, followed by being dried by means of the spray dry to obtain a pseudo-boehmite powder A. It was confirmed from the X-ray diffraction that the obtained pseudo-boehmite powder had a structure of pseudo-boehmite. The dispersibility index of the pseudo-boehmite powder A was 0.54.

A nitric acid aqueous solution in an amount of 3.25% by weight was added to the obtained boehmite powder to start the kneading. The kneading was performed for 2 hours while adding water. The mixture was formed into cylinder matters having a diameter of 0.8 mm and lengths of 3 to 5 mm by using an extruding forming machine. It was confirmed from the X-ray diffraction that the dried pellets had a structure of pseudo-boehmite. After that, the calcination was performed for 1 hour at 600° C., 700° C., and 800° C. by using a rotary kiln to obtain Carrier 1, Carrier 2, and Carrier 3. For the purpose of comparison, the calcination was performed at 600° C. and 800° C. by using a commercially available pseudo-boehmite powder B having a phosphorus content of not more than 0.03% by weight (molar ratio of phosphorus with respect to aluminum P/Al=not more than 0.0005) to manufacture Carrier 4 and Carrier 5 with the other conditions which were the same. It is considered that the phosphorus, which is contained in the commercially available pseudo-boehmite powder B, originates from any impurity contained in the aluminum solution used as the raw material.

Molybdenum and nickel were carried on Carriers 1 to 5 by means of the following method respectively to obtain Catalysts 1 to 5. An aqueous solution, which was obtained by dissolving ammonium heptamolybdate $(NH_4)_4Mo_7O_{24}$ in an ammonium solution, was diluted to be in a water absorption amount of the carrier, and the carrier was impregnated therewith by means of the pore-filling method. The impregnated matter was dried overnight at 130° C., and then the carrier was impregnated with an aqueous solution of nickel nitrate $Ni(NO_3)_2$ in an amount corresponding to the water absorption amount by means of the pore-filling method. The impregnated matter was dried overnight at 130° C., followed by being calcinated at 450° C. for 25 minutes in air by using a ventilation type rotary kiln to prepare the catalysts. The characteristics of the catalysts are shown in Table 1.

The specific surface area, the pore volume (within a range of pore diameters of 5 to 60 nm), and the median pore diameter of the carriers and the catalysts were measured by using ASAP 2400 Type produced by Micrometritics. The side surface fracture strength was measured as the mechanical strength of the catalyst pellets by using an apparatus for measuring the tablet fracture strength (Tablet Hardness Tester) TH-203CP produced by TOYAMA SANGYO CO., LTD. The measurement probe used had a circular tip with a diameter of 5.0 mm. The operation, in which the probe was allowed to abut against a central side surface portion of the cylinder pellet to perform the measurement, was repeated 20 times. An obtained average value was regarded as a value of the measurement.

The desulfurization activity and the demetallation activity were measured for Catalysts 1 to 5 by means of an experiment of hydrorefining heavy oil under the following condition. Obtained results are shown in Table 1 in combination. The characteristic of a feed oil of atmospheric distillation residue originating from the Middle East was as follows. That is, the density was 0.978 g/mL, the sulfur content was 4.162% by weight, the nitrogen content was 2,230 ppm by weight, the vanadium element was 67 ppm by weight, and the nickel element was 21 ppm by weight. A reactor having a diameter of 2.5 cm and a length of 100 cm, which was packed with 100 mL of the catalyst, was used for the reaction of the hydrorefining. The sulfurization treatment was performed with an oil obtained by dissolving 1% by weight of carbon disulfide in gas oil. The hydrorefining reaction condition was as follows. That is, the hydrogen purity was not less than 99.9%, the hydrogen pressure was 14.0 MPa, the liquid hourly space velocity was $1.0\ hr^{-1}$, and the hydrogen/oil ratio was 1,000 NL/L. The sulfur content and the metal content (vanadium and nickel) in the produced oil sampled at reaction temperatures of 360° C., 380° C., and 400° C. were analyzed. Assuming that the reaction order concerning the desulfurization was quadratic and the reaction order concerning the demetallation was linear, the reaction rate constant of the desulfurization and the reaction rate constant of the demetallation were determined for the respective catalysts. A value, which was obtained by stan-

TABLE 1

| | | Carrier | | | | |
|---|---|---|---|---|---|---|
| | | Carrier 1 | Carrier 2 | Carrier 3 | Carrier 4 | Carrier 5 |
| Pseudo-boehmite powder | | A | A | A | B | B |
| Calcination temperature | | 600° C. | 700° C. | 800° C. | 600° C. | 800° C. |
| Catalyst | | Catalyst 1 | Catalyst 2 | Catalyst 3 | Catalyst 4 | Catalyst 5 |
| Specific surface area (m²/g) | | 294 | 279 | 194 | 234 | 169 |
| Pore volume (ml/g) | | 0.62 | 0.64 | 0.63 | 0.63 | 0.75 |
| Median pore diameter (nm) | | 8.7 | 9.2 | 11.5 | 9.3 | 12.3 |
| Catalyst side surface fracture strength (kg) | | 6.5 | 5.7 | 4.5 | 2.8 | 2.5 |
| Mo content (% by weight) | | 7.9 | 7.8 | 7.7 | 8.3 | 7.6 |
| Ni content (% by weight) | | 2.1 | 2.2 | 2.2 | 2.3 | 2.2 |
| Phosphorus content (% by weight) | | 0.6 | 0.7 | 0.7 | not more than 0.03 | not more than 0.03 |
| Rate constant of desulfurization reaction | 360° C. | 1.98 | 2.15 | 2.26 | 2.09 | 1.85 |
| | 380° C. | 3.86 | 4.15 | 4.61 | 4.25 | 3.82 |
| | 400° C. | 7.35 | 8.26 | 9.99 | 8.72 | 8.55 |
| Relative desulfurization activity | | 90 | 98 | 110 | 100 | 92 |
| Rate constant of demetallation reaction | 360° C. | 0.83 | 0.84 | 1.04 | 0.99 | 1.12 |
| | 380° C. | 1.04 | 1.09 | 1.34 | 1.18 | 1.42 |
| | 400° C. | 1.30 | 1.37 | 1.74 | 1.52 | 1.90 |
| Relative demetallation activity | | 86 | 89 | 111 | 100 | 119 |
| P/Al molar ratio in carrier | | 0.012 | 0.012 | 0.012 | not more than 0.0005 | not more than 0.0005 | dardizing the average value of the reaction rate constants at each of the temperatures on the basis of the reference (100) of Catalyst 4, was regarded as the relative activity.

Example 2

Evaluation of Catalyst Life 1

Catalyst 6 manufactured in the same manner as Catalyst 3, Catalyst 7 manufactured in the same manner as Catalyst 4, and Catalyst 8 were used to perform a hydrorefining experiment based on the use of a feed oil of Ratawi heavy oil in order to evaluate the catalyst life. Catalyst 8 was a catalyst obtained by adding phosphorus to a carrying solution and impregnating Carrier 4 therewith by means of the pore-filling method. That is, ion exchange water was added to dissolve 17.8 g of ammonium heptamolybdate $(NH_4)_4Mo_7O_{24}.4H_2O$ produced by Wako Pure Chemical Industries, Ltd. in order to obtain a solution to which 7.8 g of 28% by weight of an ammonium solution produced by Kanto Kagaku was added to prepare a solution which was diluted into a solution amount corresponding to the water absorption amount of 100 g of Carrier 4, and 100 g of Carrier 4 was impregnated therewith by means of the pore-filling method. The impregnated matter was dried overnight at 130° C. After that, ion exchange water was added to 13.1 g of nickel nitrate $Ni(NO_3)_2.6H_2O$ produced by Kanto Kagaku to obtain a dissolved solution to which 4.5 g of phosphoric acid produced by Kanto Kagaku was added to prepare a solution which was diluted into a solution amount corresponding to the dried matter water absorption amount. The dry matter was impregnated therewith again by means of the pore-filling method. The impregnated matter was dried overnight at 130° C., followed by being calcinated in air at 450° C. for 25 minutes by using a ventilation type rotary kiln to obtain Catalyst 8. Characteristics of Catalyst 6, Catalyst 7, and Catalyst 8 are summarized in Table 2.

TABLE 2

| | Carrier | | |
|---|---|---|---|
| | Carrier 6 | Carrier 7 | Carrier 4 |
| Pseudo-boehmite powder | A | B | B |
| Calcination temperature | 800 | 600 | 600 |
| Catalyst | Catalyst 6 | Catalyst 7 | Catalyst 8 |
| Specific surface area (m²/g) | 201 | 252 | 211 |
| Pore volume (ml/g) | 0.65 | 0.62 | 0.55 |
| Median pore diameter (nm) | 11.4 | 9.1 | 9.5 |
| Mo content (% by weight) | 7.6 | 7.9 | 8.2 |
| Ni content (% by weight) | 2.1 | 2.2 | 2.4 |
| Phosphorus content (% by weight) | 0.7 | not more than 0.03 | 1.1 |
| P/Al molar ratio | 0.012 | not more than 0.0005 | 0.019 |

Figure 2:
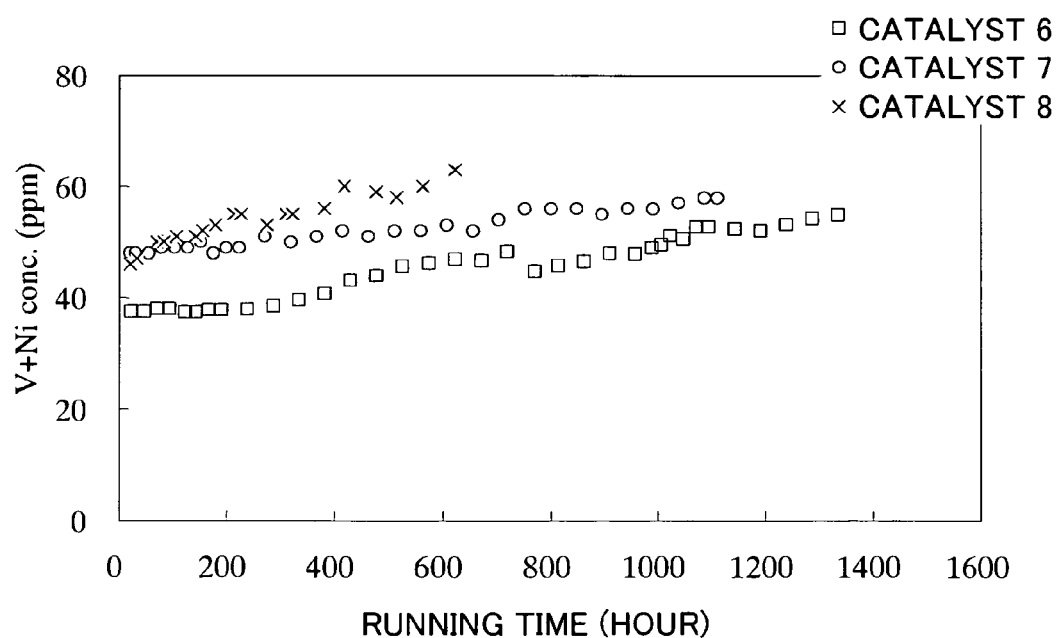
FIG. 2 shows a graph illustrating results of the hydrorefining treatment based on the use of Catalysts 6 to 8 manufactured in Examples, which depicts the relationship of the total concentration of nickel and vanadium in the produced oil with respect to the running time.

The characteristic of the feed oil was as follows. That is, the density was 1.03 g/cm³, the sulfur content was 5.64% by weight, the vanadium content was 129 ppm by weight, and the nickel content was 49 ppm by weight. Two reactors, each of which had a diameter of 2.5 cm and a length of 100 cm packed with 100 cm³ of the catalyst, were connected and used for the hydrorefining reaction. A sulfurization treatment was performed with oil obtained by dissolving 1% by weight of carbon disulfide in gas oil. The reaction condition was as follows. That is, the hydrogen purity was not less than 99.9%, the hydrogen pressure was 14.0 MPa, the liquid hourly space velocity was 0.5 hr$^{-1}$, and the hydrogen/oil ratio was 1,000 NL/L. The hydrodesulfurization reaction and the demetallation reaction were performed at 390° C. FIG. 1 shows the relationship of the sulfur concentration in the produced oil with respect to the running time, and FIG. 2 shows the relationship of the total concentration of nickel and vanadium in the produced oil with respect to the running time. The initial desulfurization activity of Catalyst 6 was higher than that of Catalyst 7 by about 25%. The activity of Catalyst 6 was superior over the entire period, and the service life of the catalyst was prolonged as well. Catalyst 8, which was obtained by adding phosphorus to the carrying solution followed by the impregnation, had the initial desulfurization activity equivalent to that of Catalyst 6, but the deterioration was conspicuous. The demetallation activity had the same tendency as that of the desulfurization activity as well.

Example 3

Evaluation of Catalyst Life 2

An aluminum hydrochloride aqueous solution having an aluminum concentration of 2.6 mol/L was prepared, in which phosphoric acid was added so that the phosphorus concentration was 0.03 mol/L. 4.6 mol/L of a sodium hydroxide aqueous solution was added dropwise to warmed water to make adjustment so that pH was 9.0. After that, the aluminum hydrochloride aqueous solution and the sodium hydroxide aqueous solution were simultaneously poured continuously into a vessel while performing agitation and mixing. The liquid temperature during the mixing was 75° C. The pouring amounts of the respective solutions were adjusted so that pH was 9.0. The mixing was continued for 17 minutes to obtain 500 L of a mixture liquid. The mixture liquid was left to stand for 30 minutes, and then an obtained slurry was filtrated and washed, followed by being dried by means of the spray dry to obtain a pseudo-boehmite powder C. It was confirmed from the X-ray diffraction that the obtained pseudo-boehmite powder had a structure of pseudo-boehmite. The dispersibility index of the pseudo-boehmite powder C was 0.36.

An aqueous ammonia solution in an amount of 1% by weight was added to the obtained boehmite powder to start the kneading. The kneading was performed for 1 hour while adding water. The mixture was formed into quadrilobe pellets having a major axis of 1.5 mm, a minor axis of 1.2 mm, a stable diameter of 1.1 mm, and lengths of about 3 to 5 mm by using an extruding forming machine. The dried pellets were calcinated at 800° C. for 1 hour to obtain Carrier 9. For the purpose of comparison, Carrier 10 was obtained under the same condition as that for Carrier 9 by using a commercially available pseudo-boehmite D in which the phosphorus content was not more than 0.01% by weight.

Catalyst 9 was prepared as follows. That is, ion exchange water was added to dissolve 12.4 g of ammonium heptamolybdate $(NH_4)_4Mo_7O_{24}.4H_2O$ produced by Wako Pure Chemical Industries, Ltd. for quadrilobe Carrier 9 in order to obtain a solution to which 5.5 g of 28% by weight of an ammonium solution produced by Kanto Kagaku was added to prepare a solution which was diluted into a solution amount corresponding to the water absorption amount of 100 g of Carrier 9, and 100 g of Carrier 9 was impregnated therewith by means of the pore-filling method. The impregnated matter was dried overnight at 130° C. After that, ion exchange water was added to 8.3 g of nickel nitrate $Ni(NO_3)_2.6H_2O$ produced by Kanto Kagaku to obtain a solution which was diluted into a solution amount corresponding to the dry matter water absorption amount. The dry matter was impregnated therewith again by means of the pore-filling method. The impregnated matter was dried overnight at 130° C., followed by being calcinated in air at 450° C. for 25 minutes by using a ventilation type rotary kiln. Catalyst 10 was prepared in the same manner as Catalyst 9 by using quadrilobe Carrier 10. Characteristics of Catalyst 9 and Catalyst 10 are summarized in Table 3.

TABLE 3

|  | Carrier | | |
| --- | --- | --- | --- |
|  | Carrier 9 | Carrier 10 | Carrier 11 |
| Pseudo-boehmite powder | C | D | B |
| Calcination temperature (° C.) | 800 | 800 | 800 |
| Catalyst | Catalyst 9 | Catalyst 10 | Catalyst 11 |
| Specific surface area (m$^2$/g) | 211 | 178 | 185 |
| Pore volume (ml/g) | 0.85 | 0.82 | 0.59 |
| Median pore diameter (nm) | 16.4 | 17.7 | 11.2 |
| Mo content (% by mass) | 5.6 | 6.0 | 7.9 |
| Ni content (% by mass) | 1.5 | 1.5 | 2.2 |
| P content (% by mass) | 0.7 | not more than 0.03 | 0.5 |
| P/Al molar ratio | 0.012 | not more than 0.0005 | 0.009 |

Figure 3:
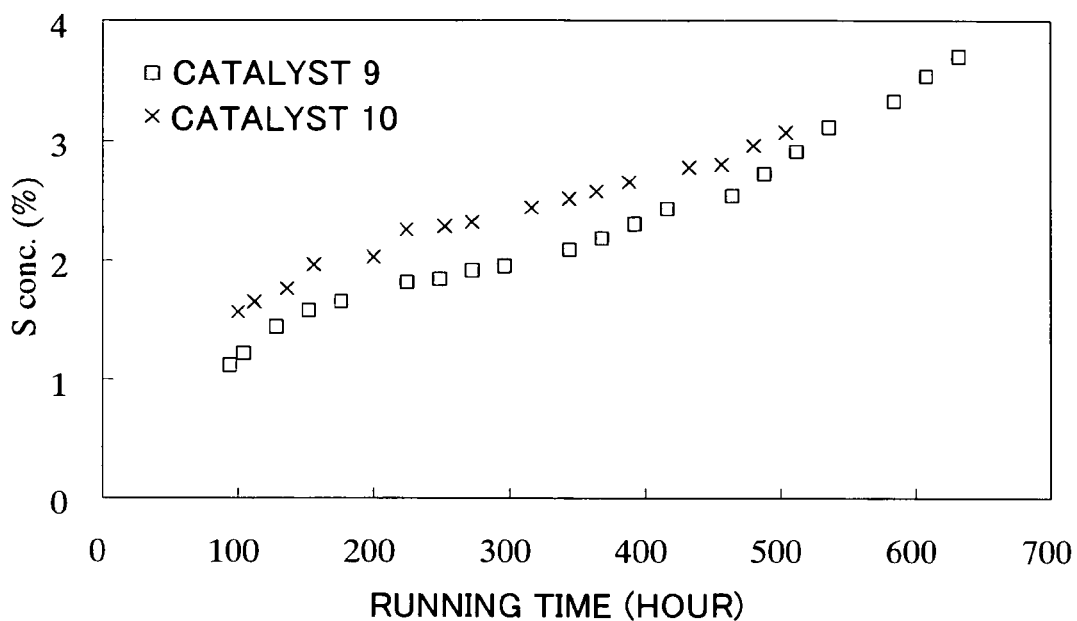
FIG. 3 shows a graph illustrating results of the hydrorefining treatment based on the use of Catalysts 9 and 10 manufactured in Examples, which depicts the relationship of the sulfur concentration in the produced oil with respect to the running time.
Figure 4:
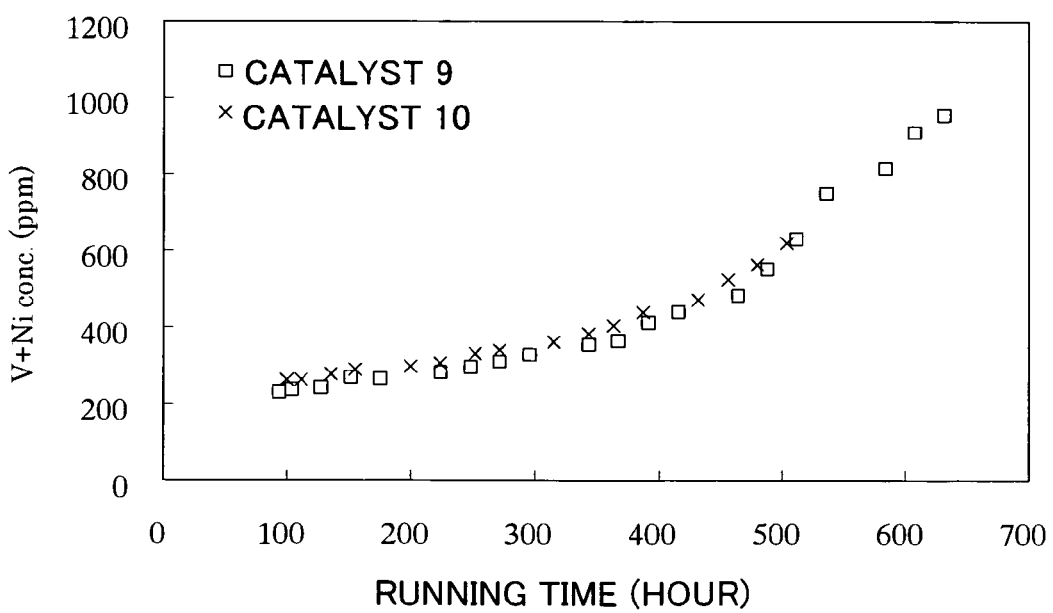
FIG. 4 shows a graph illustrating results of the hydrorefining treatment based on the use of Catalysts 9 and 10 manufactured in Examples, which depicts the relationship of the total concentration of nickel and vanadium in the produced oil with respect to the running time.

Boscan crude was used as a feed oil for Catalyst 10 and Catalyst 9. A reactor, which had a diameter of 2.5 cm and a length of 100 cm packed with 100 cm$^3$ of the catalyst, was connected to carry out the reaction by using a fixed bed reaction apparatus. A sulfurization treatment was performed with oil obtained by dissolving 1% by weight of carbon disulfide in gas oil. The reaction condition was as follows. That is, the hydrogen purity was not less than 99.9%, the hydrogen pressure was 14.0 MPa, the liquid hourly space velocity was 1.0 hr$^{-1}$, and the hydrogen/oil ratio was 670 NL/L. The characteristic of the feed oil was as follows. That is, the density was 0.995 g/cm$^3$, the sulfur content was 4.77% by weight, the vanadium content was 126 ppm by weight, the nickel content was 120 ppm by weight, and the residual carbon was 14.7% by weight. The hydrodesulfurization reaction and the demetallation reaction were performed at a reaction temperature of 390° C. The activity of the catalyst is deteriorated mainly by the poisoning with heavy metals such as nickel and vanadium contained in the feed oil. Therefore, this experiment is suitable for the purpose of evaluation of the catalyst life of the hydrodesulfurization catalyst in a short term. FIG. 3 shows the relationship of the sulfur concentration in the produced oil with respect to the running time, and FIG. 4 shows the relationship of the total concentration of nickel and vanadium in the produced oil with respect to the running time. The initial desulfurization activity and the demetallation activity of Catalyst 9 were higher than those of Catalyst 10. The activities of Catalyst 9 were superior over the entire period. The catalyst lives of the catalysts were equivalent to one another.

Example 4

3.23% by weight of nitric acid aqueous solution was added to the commercially available pseudo-boehmite powder B having the phosphorus content of not more than 0.03% by weight (molar ratio of phosphorus with respect to aluminum P/Al=not more than 0.0006) to start the kneading. The kneading was performed for 2 hours while adding water. In this procedure, a chemical reagent of phosphoric acid (produced by Kanto Kagaku, highest grade) was previously added to the nitric acid aqueous solution added to the pseudo-boehmite powder B. As for the amount of addition of phosphoric acid, phosphoric acid was added in such an amount that the phosphorus content in the carrier was 0.6% by weight. The extruding forming was performed after the kneading to obtain cylinder matters having a diameter of 0.8 mm and lengths of 3 to 5 mm. After that, the calcination was performed at 800° C. for 1 hour by using a rotary kiln to obtain Carrier 11. Molybdenum and nickel were carried on Carrier 11 by means of the same method as that used for Carriers 1 to 5 to obtain Catalyst 11. Characteristics of Catalyst 11 are summarized in Table 3.

Measurement of Degree of Crystallization

Figure 5:
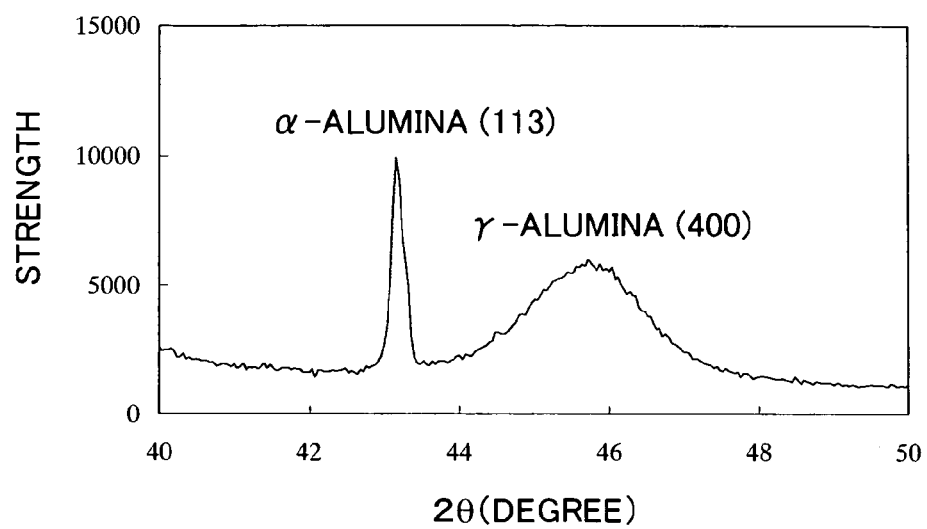
FIG. 5 shows a graph illustrating results of the X-ray diffraction for Carriers 1, 2, 3, and 9.

The peak distribution was measured by means of the X-ray diffraction for Carrier 1, Carrier 2, Carrier 3, and Carrier 9. The measurement was performed under a condition in which the tube current and the tube voltage were 400 mA and 40 kV respectively. Assuming that 2θ was 5° per 1 minute for the scanning speed, the scanning was performed over a range of 2θ from 3° to 90°. The following sample was used. That is, the carrier was pulverized in a mortar until the carrier was formed into a powder. 0.05 gram of α-alumina was added as an internal standard with respect to 0.5 gram of the pulverized matter. The obtained matter was uniformly mixed in the mortar again. The measured peak distribution over the range of 2θ from 40° to 50° was as shown in FIG. 5. A (113) peak of α-alumina and a (400) peak of γ-alumina were clearly confirmed. The α-alumina used in this procedure was obtained by calcinating commercially available γ-alumina ("PURAL SB1" produced by Sasol) at 1,600° C. for 36 hours.

Subsequently, the half value widths of the (113) peak of α-alumina and the (400) peak of γ-alumina were determined. Obtained results are as shown in Table 4 assuming that Wα represents the half value width of the (113) peak of α-alumina and Wγ represents the half value width of the (400) peak of γ-alumina. Further, the change of (Wγ/Wα) with respect to the calcination temperature was determined. As a result, it was revealed that the value of (Wγ/Wα) was not more than 10.1 when the calcination temperature was not less than 650° C. According to the investigation performed by the present inventors, it was revealed that the crystallization of alumina was sufficient and the high catalytic activity was obtained when the value of (Wγ/Wα) was not more than about 10. Therefore, according to the results shown in Table 4, it is appreciated that the value of (Wγ/Wα) is not more than 10.1 when the calcination temperature is not less than 650° C., and the value is preferably not more than 9.0.

TABLE 4

| Sample | Carrier calcination temperature (° C.) | Half value width Wγ of γ-alumina (400) | Half value width Wα of α-alumina (113) | Wγ/Wα |
| --- | --- | --- | --- | --- |
| Carrier 1 | 600 | 2.166 | 0.203 | 10.7 |
| Carrier 2 | 700 | 1.971 | 0.207 | 9.5 |
| Carrier 3 | 800 | 1.821 | 0.209 | 8.7 |
| Carrier 9 | 800 | 1.804 | 0.205 | 8.8 |

Differential Thermal Analysis

Figure 6:
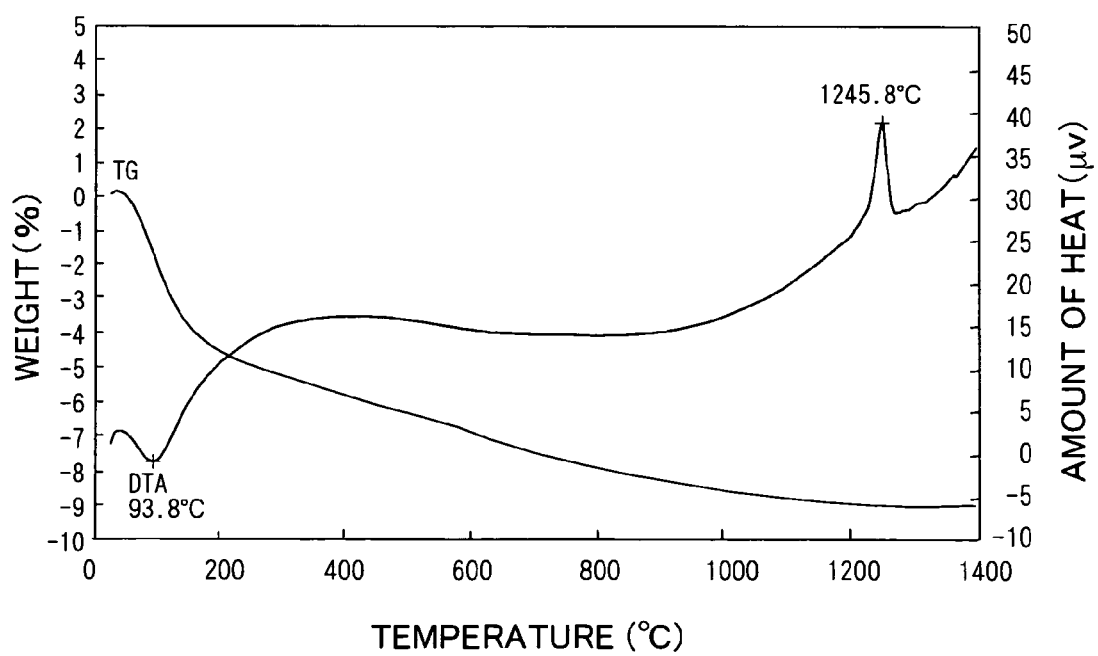
FIG. 6 shows a graph illustrating endothermic/exothermic peaks measured for Carrier 4 by means of the differential thermal analysis method.

The endothermic/exothermic peaks were measured by means of the differential thermal analysis method (TG-DTA) for Carrier 1, Carrier 2, Carrier 3, Carrier 4, Carrier 9, Carrier 10, and Carrier 11. The measurement was performed by using TAS200 produced by Rigaku. The respective carriers were pulverized in a mortar to obtain powders each of which was accommodated in an alumina crucible to be used for the measurement. The temperature was raised at a speed of 10° C. per 1 minute from room temperature to 1,400° C. FIG. 6 shows a situation of the endothermic/exothermic peaks and the heat decrease amount measured for Carrier 4. A distinct exothermic peak is observed in the vicinity of 1,245° C. This resides in the heat generation brought about by the phase transition from γ-alumina to α-alumina. Table 5 summarizes the exothermic peak temperatures brought about by the phase transition from γ-alumina to α-alumina measured for the respective carriers. It is appreciated that the exothermic temperature peak is not less than 1,350° C. for all of the carriers which use the pseudo-boehmite powder formed by neutralizing the aluminum solution containing phosphorus, probably for the following reason. That is, it is considered that a large amount of energy is required to crystallize alumina as compared with a case in which alumina is used singly, because phosphorus and aluminum are chemically bonded in alumina to give a stable state in view of the energy. In particular, phosphorus is uniformly distributed in alumina as described later on in the alumina carrier according to the present invention. Therefore, the phase transition temperature from γ-alumina to α-alumina is considerably higher than that for ordinary alumina. In the case of Carrier 11 prepared by allowing the pseudo-boehmite to contain phosphorus by means of the kneading, the exothermic peak temperature brought about by the phase transition from γ-alumina to α-alumina was 1,307° C.

TABLE 5

| Carrier | Phosphorus contained | Exothermic peak temperature brought about by phase transition from γ-alumina to α-alumina (° C.) |
|---|---|---|
| Carrier 1 | yes | 1,385 |
| Carrier 2 | yes | 1,391 |
| Carrier 3 | yes | 1,385 |
| Carrier 4 | no | 1,246 |
| Carrier 9 | yes | 1,375 |
| Carrier 10 | no | 1,250 |
| Carrier 11 | yes | 1,307 |

EPMA Measurement

Figure 7:
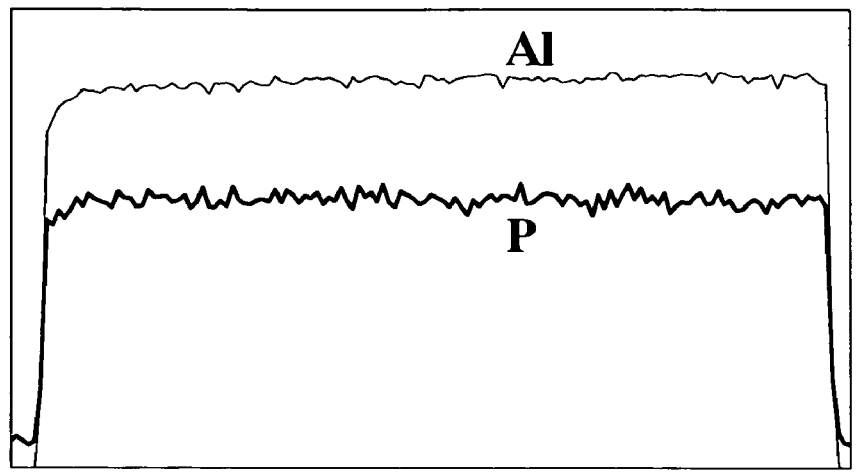
FIG. 7 shows a graph illustrating concentration distributions of Al and P over a catalyst cross section measured by means of the EPMA measurement for Catalyst 3.
Figure 8:
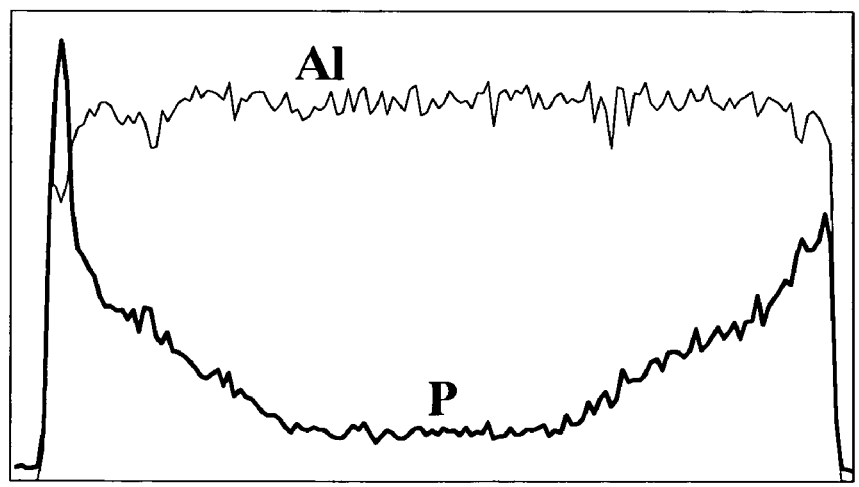
FIG. 8 shows a graph illustrating concentration distributions of Al and P over a catalyst cross section measured by means of the EPMA measurement for Catalyst 8.

The line analysis of the metal distribution was performed for the catalyst cross section by means of EPMA (Electron Probe Micro Analysis) for Catalyst 1, Catalyst 2, Catalyst 3, Catalyst 8, and Catalyst 9. The measurement was directed to Al, the active metals of Mo and Ni, and phosphorus under a condition in which the acceleration voltage was 20 kV, the probe current was 0.1 μA, the beam diameter was 10 μmφ, and the step width was 10 μm. FIG. 7 shows measured distributions of respective components on a cross section of Catalyst 3, and FIG. 8 shows measured distributions of respective components on a cross section of Catalyst 8. It is appreciated that the distribution of phosphorus in the catalyst is uniform in relation to Catalyst 3 manufactured with the pseudo-boehmite synthesized by using the raw material containing phosphorus, while phosphorus is unevenly distributed at outer circumferential portions of the catalyst in relation to Catalyst 8 obtained by adding phosphorus to the carrying solution and performing the impregnation by means of the pore-filling method, probably for the following reason. That is, it is considered that phosphorus is adsorbed to the catalyst surface and phosphorus is not permeated into the inside during the impregnation and the carrying, because phosphorus has a strong power to cause the adsorption to aluminum. If phosphorus is unevenly distributed at only the outer circumferential portions, the surface activity is extremely increased. Therefore, it is considered that the pores tend to be closed by the deposition of metal, resulting in a short catalyst life. On the other hand, it is considered that Catalyst 3 is the catalyst having the high activity and the long catalyst life, because Catalyst 3 uniformly contains phosphorus at the inside of the catalyst. These features are also in agreement with the results of the activity evaluation shown in FIGS. 1 and 2. Table 6 shows results of calculation of the dispersion of the phosphorus distribution in the catalyst cross section in relation to both of them. It is appreciated that any one of the catalysts, which is manufactured from the pseudo-boehmite synthesized with the raw material containing phosphorus, has the dispersion of phosphorus of not more than 10%. The dispersion is herein defined by the value obtained by dividing the standard deviation in the pellet by the average value.

TABLE 6

| | Method for adding phosphorus | Al dispersion (%) | P dispersion (%) | Mo dispersion (%) | Ni dispersion (%) |
|---|---|---|---|---|---|
| Catalyst 1 | addition to Al solution | 3 | 4 | 12 | 10 |
| Catalyst 2 | addition to Al solution | 2 | 3 | 3 | 5 |
| Catalyst 3 | addition to Al solution | 3 | 5 | 12 | 9 |
| Catalyst 8 | addition to carrying solution | 5 | 64 | 14 | 15 |
| Catalyst 9 | addition to Al solution | 2 | 3 | 5 | 9 |

Example 5

An aluminum sulfate aqueous solution having an aluminum concentration of 1.0 mol/L in which phosphoric acid was added so that the phosphorus concentration was 0.1 mol/L, and a sodium aluminate aqueous solution having an aluminum concentration of 1.0 mol/L were prepared (molar ratio of phosphorus with respect to total aluminum in aluminum sulfate and sodium aluminate satisfied P/Al=0.035). The sodium aluminate aqueous solution was added dropwise to warmed water to make adjustment so that pH was 9.0. After that, the aluminum sulfate aqueous solution and the sodium aluminate aqueous solution were simultaneously poured continuously into a vessel while performing agitation and mixing. The liquid temperature during the mixing was 60° C. The pouring amounts of the respective solutions were adjusted so that pH was 9.0. The mixing was continued for 20 minutes to obtain 500 L of a mixture liquid. The mixture liquid was left to stand for 30 minutes, and then an obtained slurry was filtrated and dehydrated, followed by being dried by means of the spray dry to obtain a pseudo-boehmite powder C. It was confirmed from the X-ray diffraction that the obtained pseudo-boehmite powder had a structure of pseudo-boehmite. The dispersibility index of the pseudo-boehmite powder was 0.43.

Carrier 12 was prepared by using the obtained boehmite powder C in accordance with the same method as that used for Carrier 3. Catalyst 12 was prepared by using Carrier 12 in accordance with the same method as that used for Catalyst 3. The desulfurization activity and the demetallation activity of Catalyst 12 were measured in accordance with the same method as that used for the evaluation of the initial activity of Catalyst 3. The characteristic of Catalyst 12 and the result of the evaluation of the initial activity are shown in Table 7.

Example 6

A pseudo-boehmite powder D was obtained in accordance with the same method as that used for the pseudo-boehmite powder C except that an aluminum sulfate aqueous solution having an aluminum concentration of 1.0 mol/L in which phosphoric acid was added so that the phosphorus concentration was 0.01 mol/L, and a sodium aluminate aqueous solution having an aluminum concentration of 1.0 mol/L were prepared (molar ratio of phosphorus with respect to total aluminum in aluminum sulfate and sodium aluminate satisfied P/Al=0.002). It was confirmed from the X-ray diffraction that the obtained pseudo-boehmite powder had a structure of pseudo-boehmite. The dispersibility index of the pseudo-boehmite powder was 0.52.

Carrier 13 was prepared by using the obtained boehmite powder D in accordance with the same method as that used for Carrier 3. Catalyst 13 was prepared by using Carrier 13 in accordance with the same method as that used for Catalyst 3. The desulfurization activity and the demetallation activity of Catalyst 13 were measured in accordance with the same method as that used for the evaluation of the initial activity of Catalyst 3. The characteristic of Catalyst 13 and the result of the evaluation of the initial activity are shown in Table 7.

TABLE 7

| | Carrier | |
|---|---|---|
| | Carrier 12 | Carrier 13 |
| Pseudo-boehmite powder | C | D |
| Catalyst | Catalyst 12 | Catalyst 13 |
| Specific surface area (m$^2$/g) | 189 | 191 |
| Pore volume (ml/g) | 0.64 | 0.62 |
| Median pore diameter (nm) | 11.2 | 11.3 |
| Catalyst side surface fracture strength (kg) | 5.1 | 4.8 |
| Mo content (% by weight) | 7.8 | 8.0 |
| Ni content (% by weight) | 2.2 | 2.2 |
| P content (% by weight) | 1.8 | 0.1 |
| Constant of desulfurization reaction 360° C. | 2.34 | 2.15 |
| 380° C. | 4.80 | 4.38 |
| 400° C. | 10.55 | 9.50 |
| Relative desulfurization activity | 115 | 105 |
| Constant of demetallation reaction 360° C. | 1.09 | 1.02 |
| 380° C. | 1.32 | 1.22 |
| 400° C. | 1.79 | 1.65 |
| Relative demetallation activity | 113 | 105 |
| P/Al molar ratio in carrier | 0.035 | 0.002 |

INDUSTRIAL APPLICABILITY

According to the present invention, the hydrorefining catalyst is produced by using the carrier obtained by forming the pseudo-boehmite powder manufactured by neutralizing the aluminum solution containing the specified amount of phosphorus, and performing the calcination at a temperature of not less than 650° C. The catalyst has the practically sufficient mechanical strength, and the catalyst exhibits the high desulfurization activity and the high demetallation activity.

The invention claimed is:

1. A method for producing a hydrorefining catalyst for removing heteroelements contained in hydrocarbon oil to be treated comprising:

a step of preparing an aluminum solution containing phosphorus in a molar ratio of 0.001 to 0.05 with respect to aluminum;

a step of neutralizing the prepared aluminum solution to produce a pseudo-boehmite powder;

a step of forming the pseudo-boehmite powder followed by performing calcination at a temperature of not less than 650° C. to obtain a carrier comprised of γ-alumina as the main component wherein the γ-alumina is in crystalline form; and a step of carrying a hydrogenation-active metal on the pseudo-boehmite powder or the carrier.

2. The method for producing the hydrorefining catalyst according to claim 1, wherein the calcination temperature is 700° C. to 900° C.

3. The method for producing the hydrorefining catalyst according to claim 1, wherein the hydrogenation-active metal is carried by impregnating the carrier with a solution containing the hydrogenation-active metal followed by further performing calcination.

4. The method for producing the hydrorefining catalyst according to claim 1, further comprising a step of kneading the formed pseudo-boehmite powder wherein the hydrogenation-active metal is carried by adding the hydrogenation-active metal during the kneading step of the formed pseudo-boehmite powder.

5. The method for producing the hydrorefining catalyst according to claim 1, wherein the hydrogenation-active metal is at least one selected from the group consisting of molybdenum, tungsten, cobalt, and nickel.

6. A hydrorefining catalyst which is obtained in accordance with the method as defined in claim 1.

7. The method for producing the hydrorefining catalyst according to claim 1, wherein the carrier comprises not less than 80 wt. % of γ-alumina.

8. A carrier for a hydrorefining catalyst for removing heteroelements contained in hydrocarbon oil to be treated comprising:

γ-alumina which is a main component wherein the γ-alumina is in crystalline form; and phosphorus which is contained in a molar ratio of 0.001 to 0.05 with respect to aluminum, wherein:

a dispersion of a concentration distribution of phosphorus in the carrier is within 10%; and an exothermic peak temperature, which is brought about by phase transition of γ-alumina into α-alumina when the carrier is subjected to differential thermal analysis, is not less than 1,300° C.

9. The carrier for the hydrorefining catalyst according to claim 8, wherein the exothermic peak temperature is not less than 1,350° C.

10. The carrier for the hydrorefining catalyst according to claim 8, wherein a half value width Wγ of a (400) peak of powder X-ray diffraction of γ-alumina satisfies (Wγ/Wα)≦10 with respect to a half value width Wα of a (113) peak of α-alumina.

11. A hydrorefining catalyst comprising:

the carrier for the hydrorefining catalyst as defined in claim 8, and a hydrogenation-active metal which is carried on the carrier.

12. The hydrorefining catalyst according to claim 10, wherein the carrier comprises not less than 80 wt. % of γ-alumina.

13. The carrier for the hydrorefining catalyst according to claim 8, wherein the carrier comprises not less than 80 wt. % of γ-alumina.

* * * * *

UNITED STATES PATENT AND TRADEMARK OFFICE
CERTIFICATE OF CORRECTION

PATENT NO. : 7,265,075 B2
APPLICATION NO. : 10/483123
DATED : September 4, 2007
INVENTOR(S) : Takayuki Tsukada et al.

It is certified that error appears in the above-identified patent and that said Letters Patent is hereby corrected as shown below:

Claim 12, column 18, line 60:

"The hydrorefining catalyst according to claim 10," should read --The hydrorefining catalyst according to claim 11,--

Signed and Sealed this

Fifteenth Day of July, 2008

JON W. DUDAS
*Director of the United States Patent and Trademark Office*